April 30, 1929.         C. W. BALKE         1,710,806
ELECTROLYTIC RECTIFIER
Filed July 18, 1927
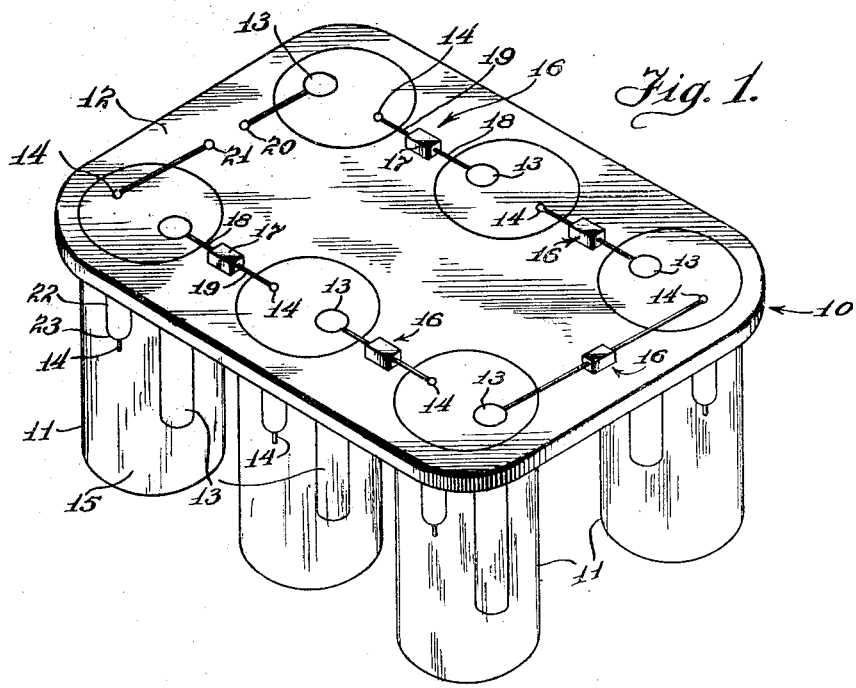
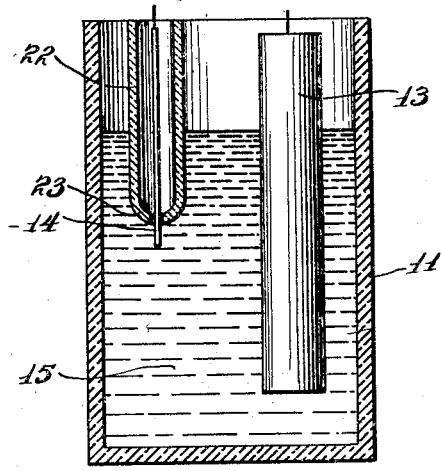
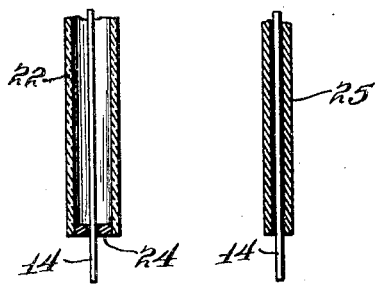
Inventor:
Clarence W. Balke
By Williams, Bradbury,
McCabe & Neville
Attorneys Patented Apr. 30, 1929.

1,710,806

UNITED STATES PATENT OFFICE.

CLARENCE W. BALKE, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK.

ELECTROLYTIC RECTIFIER.

Application filed July 18, 1927. Serial No. 206,444.

This invention relates to improvements in electrolytic rectifiers and pertains more particularly to a method of stabilizing the output.

Electrolytic rectifiers are used to a very large extent for the purpose of supplying direct current power for operating radio receiving units. The best known and most permanent electrolytic rectifier of this type comprises an acid-proof receptacle containing sulphuric acid electrolyte in which are immersed tantalum and lead electrodes. For some purposes it is necessary that these cells be connected in series; and in most cases it is very important that the voltage output be uniform and constant. In B current supply units now on the market, the output has been found to decrease after a limited use of the equipment.

The object of this invention is to provide means for preventing a decrease in the output and to stabilize the action of the rectifier cells.

A further object of the invention is to provide an improved tantalum electrode with means for limiting its exposed area.

A further object of the invention is to provide improved rectifier structure.

Other objects will be apparent as the detailed description of the invention proceeds.

In the drawings, wherein similar reference characters refer to like parts in the several figures, Fig. 1 is a perspective of a rectifier unit adapted for use in a B current supply system.

Fig. 2 is a diagrammatic longitudinal section of a single cell showing improved means for limiting the exposed area of the tantalum electrode.

Figures 3 and 4 are sections of other embodiments of the improved tantalum electrode.

The B current required by any ordinary radio receiving set is usually at a potential of about 135 volts. When a battery is used as this current supply source, the voltage remains practically constant and no difficulty is encountered due to voltage drop (until the cells run down).

However, with rectified current, the case is different. A step-up transformer is usually employed to supply an alternating current of about 180 volts to a series of rectifiers to obtain a direct current voltage of about 135. In the cells heretofore used, it has been found that the direct current voltage drops from 130 to 110 or from 140 to 120 when the cell has been used for a few hours. This decrease in output is a very serious detriment.

Efforts have been made to overcome the difficulty by varying the electrolyte and by providing means for short-circuiting the cell to restore its original output; but these have not been satisfactory.

I have found that the problem may be satisfactorily solved by regulating the exposed area of the tantalum electrode.

In Fig. 1, unit 10 is illustrated which is composed of six glass receptacles 11, supported in insulating cover 12. Each cell includes a lead electrode 13 and a tantalum electrode 14, immersed in a sulphuric acid electrolyte, specific gravity 1.20, to which has been added a small amount of iron for reducing the internal resistance of the cell and a small amount of cobalt for protecting the lead and preventing sulphation.

It is understood, however, that this is only a preferred embodiment and that any other suitable valve metal such as tantalum alloys may be used in place of tantalum and any non-valve metal in place of lead, together with a suitable electrolyte which will not react with the electrodes and which will give the desired charging rate.

The tantalum electrode of each cell is connected to the lead electrode of the following cell by a lead connector 16, which is preferably a lead button 17, resting on plate 12, and provided with a lead arm 18, welded to the lead electrode, and an arm 19, welded or otherwise suitably secured to the tantalum electrode.

Between the two end cells, binding posts 20 and 21 are substituted for a lead connector 16, as shown in the drawing.

Instead of using the convention tantalum ribbon for an electrode, I use a tantalum wire 14 which is surrounded by a collar or tube 22. The tube, preferably of glass, extends below the surface of the eletrolyte and is drawn inwardly at 23, to substantially conform in size and shape to the electrode and the joint may be rendered tight by means of a little wax or rubber compound. This absolutely fixes the active area and prevents any change of output due to a change in area.

It can be readily be ascertained by anyone skilled in the art that a decrease in exposed area will give a higher charging rate due to the decreased capacity. The degree of rectification is therefore increased by a smaller exposed area.

However, a smaller exposed area means a higher current density and therefore a higher $I^2R$ loss. This excessive heating, with the other variables which must be considered, might tend to cause a deterioration of the electrode. To avoid this effect, the electrode has heretofore been made with a relatively large area.

I have found, however, that by using an exposed area of from 0.5 to 1.5 square inches per ampere of direct current, an optimum charging rate is obtained without danger of destruction of the electrode. The unexpected result is that the use of such an area, preferably about 1.0 square inch per ampere of direct current, serves not only to give optimum values of charging rate and heating effect but serves also to stabilize the output.

By an extended series of tests I have demonstrated that the output does not have the characteristic drop when the area of the tantalum electrode is regulated in this manner.

My invention then consists essentially in restricting the active immersed surface of the valve metal to a certain area dependent upon the current to be passed. In other words, the current density is regulated to correspond to the active exposed area. Either current or area may be varied as long as the final current density is of the desired magnitude.

In Fig. 3, a glass tube 22 is provided with an insulating plug 24 which prevents the electrolyte from entering the tube and thereby limits the active area of the electrode.

In Fig. 4, the tantalum electrode is coated by an acid-proof insulator 25 to limit the active area of the electrode.

The theory underlying this phenomena is not thoroughly understood, but the operation is probably due to the characteristics of the film which is formed under these circumstances. Connection of rectifying cells in series has heretofore presented the problem of balancing the load, and my invention, regulating the active areas of the individual cells, solves this problem in a very simple and unique manner.

While I have given specific details of a preferred embodiment of my invention, it is understood that I am not limited thereby except as defined by the following claims.

I claim:

1. The method of stabilizing the output of a tantalum-lead-sulphuric-acid electrolytic rectifier unit which consists in controlling the current density at about 1 ampere for every 0.5 to 1.5 square inches of active tantalum surface exposed.

2. A tantalum electrode for an electrolytic rectifier of the tantalum-lead-sulphuric-acid type proportioned to expose about 0.5 to 1.5 square inches of surface per ampere of direct current delivered whereby the voltage ouput may be stabilized in a current rectification unit.

3. The method of maintaining a constant output in tantalum-lead-sulphuric acid rectifier units which comprises adjusting the active exposed area of the tantalum electrodes to about 1.0 square inch per ampere of direct current rectifier.

4. An electrolytic rectifier including a plurality of electrolytic cells connected in series, a sulphuric acid electrolyte, a lead electrode and a tantalum electrode in each cell, the tantalum electrode being proportioned to expose to the electrolyte about 0.5 to 1.5 square inches of surface per ampere of direct current delivered whereby the voltage output of the rectifier is stabilized.

In witness whereof, I hereunto subscribe my name this 15th day of June, 1927.

CLARENCE W. BALKE.